United States Patent
Zhai et al.

(10) Patent No.: US 12,521,680 B2
(45) Date of Patent: Jan. 13, 2026

(54) HIGH PRESSURE SPIRAL WOUND MEMBRANE MODULE

(71) Applicant: BL Technologies, Inc., Minnetonka, MN (US)

(72) Inventors: Jianwen Zhai, Beijing (CN); Linglu Yang, Shanghai (CN); Tingting Wang, Jiangsu (CN); Zhiguo Wu, Shanghai (CN)

(73) Assignee: BL Technologies, Inc., Minnetonka, MN (US)

( * ) Notice: Subject to any disclaimer, the term of this patent is extended or adjusted under 35 U.S.C. 154(b) by 384 days.

(21) Appl. No.: 17/915,459

(22) PCT Filed: Mar. 30, 2021

(86) PCT No.: PCT/US2021/024872
§ 371 (c)(1),
(2) Date: Sep. 28, 2022

(87) PCT Pub. No.: WO2021/202520
PCT Pub. Date: Oct. 7, 2021

(65) Prior Publication Data
US 2023/0127513 A1    Apr. 27, 2023

(30) Foreign Application Priority Data
Apr. 1, 2020    (CN) .......................... 202010250735.5

(51) Int. Cl.
*B01D 61/02* (2006.01)
*B01D 63/10* (2006.01)
(Continued)

(52) U.S. Cl.
CPC ........... *B01D 63/10* (2013.01); *B01D 61/025* (2013.01); *B01D 61/027* (2013.01);
(Continued)

(58) Field of Classification Search
CPC ...... B01D 63/10; B01D 63/107; B01D 69/02; B01D 2325/20
See application file for complete search history.

(56) References Cited

U.S. PATENT DOCUMENTS

| | | |
|---|---|---|
| 5,128,037 A | 7/1992 | Pearl et al. |
| 5,207,916 A | 5/1993 | Goheen et al. |

(Continued)

FOREIGN PATENT DOCUMENTS

| | | |
|---|---|---|
| CL | 202202454 A1 | 3/2023 |
| CN | 103889559 A | 6/2014 |

(Continued)

OTHER PUBLICATIONS

Kim, Soomin, et al. "Upgrading polyamide TFC BWRO and SWRO membranes to higher SWRO membrane performance via surface nano-structuring with tethered poly (acrylic acid)." Journal of Membrane Science 597 (2020): 117736. (Year: 2019).*

(Continued)

*Primary Examiner* — Bradley R Spies (57) ABSTRACT

A spiral wound membrane module has a brackish water RO or NF membrane combined with a permeate carrier having a narrow spacing between membrane contacting elements. The membrane may have water permeability (A-Value) of at least $8*10^{-5}$ cm/s/bar at 25° C. The membrane may have salt diffusion rate (B-Value) of at least $0.5*10^{-5}$ cm/s at 25° C. The permeate carrier may have a density of 54 wales per inch or more of a gap between adjacent ribs of 215 um or less. The permeate carrier may have a channel cross-sectional area of $16*10^{-9}$ m² or more. Water is fed to the module at a high feed pressure, for example a pressure of at least 50 bar, optionally up to 120 bar. Retentate may be discharged at a concentration of 100 g/L, 130 g/L, or 150 g/L or more.

20 Claims, 7 Drawing Sheets

(51) Int. Cl.
  *B01D 69/02* (2006.01)
  *C02F 1/44* (2023.01)
  *C02F 103/08* (2006.01)

(52) U.S. Cl.
  CPC .......... *B01D 63/107* (2022.08); *B01D 69/02* (2013.01); *C02F 1/44* (2013.01); *B01D 2313/146* (2013.01); *B01D 2325/20* (2013.01); *C02F 2103/08* (2013.01)

(56) References Cited

U.S. PATENT DOCUMENTS

| | | | |
|---|---|---|---|
| 6,139,750 | A | 10/2000 | Graham |
| 6,224,767 | B1 | 5/2001 | Fujiwara et al. |
| 6,656,362 | B1 † | 12/2003 | Kihara |
| 9,387,445 | B2 † | 7/2016 | Kimura |
| 2006/0138031 | A1* | 6/2006 | Kloos .................. B01D 61/026 210/449 |
| 2013/0098829 | A1 | 4/2013 | Rao et al. |
| 2015/0367288 | A1 | 12/2015 | Haynes et al. |
| 2016/0236156 | A1 | 8/2016 | Rozenbaoum et al. |
| 2017/0056840 | A1* | 3/2017 | Koehler ............... B01D 63/107 |

FOREIGN PATENT DOCUMENTS

| | | |
|---|---|---|
| CN | 103889560 A | 6/2014 |
| CN | 108602019 A | 9/2018 |
| EP | 1059114 A2 | 12/2000 |
| JP | H09141067 A | 6/1997 |
| JP | 2002095935 A | 4/2002 |

OTHER PUBLICATIONS

International Preliminary Report on Patentability (IPRP) issued Sep. 29, 2022 in PCT/US2021/024872.
Written Opinion and International Search Report mailed May 7, 2022 in PCT/US2021/024872.
Davenport, Douglas M. et al., "High-Pressure Reverse Osmosis for Energy-Efficient Hypersaline Brine Desalination: Current Status, Design Consideratoins, and Research Needs", Environmental Science & Technology Letters, col. 5, No. 8, Aug. 14, 2018, pp. 467-475 [retrieved from https://pubs.acs.org/doi/pdf/10.1021/acs.estlett.8b00274].
Chile Patent Application No. 202202666, Office Action dated Jul. 22, 2024.
Saudi Arabia Application No. 522440754, Office Action dated Feb. 17, 2025.
United Arab Emirates Application No. P6002035/2022, Office Action dated Nov. 21, 2024.
Okamoto, Yoshiki and John H. Lienhard, "How RO membrane permeability and other performance factors affect process cost and energy use: A review," Desalination, 470, Nov. 15, 2019, 31 pages.
Qiu, Tianyu and Philip A. Davies, "Comparison of Configurations for High-Recovery Inland Desalination Systems," Water 2012, 4, 690-706.
Chile Patent Application No. 202202666, Office Action dated Apr. 14, 2025.
Chile Patent Application No. 202303322, Office Action dated Apr. 14, 2025.
Singapore Patent Application No. 11202253405A, Written Opinion dated Apr. 15, 2024.
Chinese Patent Application No. 202010250735.54, Office Action dated Jun. 19, 2025.
Chilean Patent Application No. 202303322, Office Action dated Oct. 17, 2025.
Indian Patent Application No. 202217060025, Office Action dated Oct. 30, 2025.

* cited by examiner
† cited by third party

HIGH PRESSURE SPIRAL WOUND MEMBRANE MODULE

CROSS-REFERENCE TO RELATED APPLICATIONS

This application is a National Stage Entry of International Application No. PCT/US2021/024872, filed Mar. 30, 2021, which claims the benefit of Chinese Application Serial No. 202010250735.5, filed Apr. 1, 2020.

FIELD

This specification relates to spiral wound membrane modules, for example nanofiltration and reverse osmosis modules, and to nanofiltration and reverse osmosis processes.

BACKGROUND

Reverse osmosis (RO) and nanofiltration (NF) membranes are made, for example, for seawater and brackish water desalination. Brackish water RO membranes (BWRO) typically have higher water permeability and salt permeability than seawater reverse osmosis membranes (SWRO). BWRO membranes typically operate at lower pressures than SWRO membranes. For example, a BWRO membrane may be operated at about 15 bar whereas a SWRO membrane may be operated at about 55 bar.

INTRODUCTION

This specification describes a spiral wound membrane module having a brackish water RO or NF membrane combined with a permeate carrier having a narrow spacing between membrane contacting elements. The membrane may have water permeability (A-Value) of at least $8*10^{-5}$ cm/s/bar at 25° C. The membrane may have salt diffusion rate, alternatively called salt permeability, (B-Value) of at least $0.5*10^{-5}$ cm/s at 25° C. The permeate carrier may be, for example, a tricot knit fabric wherein the membrane contacting elements are a set of generally parallel ribs, alternatively called wales. The permeate carrier may have a density of 54 wales per inch or more; a flow channel width measured at wide parts of the channel of 215 micrometers or less; or, an average flow channel width of 175 micrometers or less. Optionally, the permeate carrier may also have epoxy coating of 20 wt % or less; flow channel width measured at narrow parts of the channel of 83 micrometers or more; average flow channel width of 121 micrometers or more; or, a channel cross-sectional area of $16*10^{-9}$ m$^2$ or more.

This specification describes a process for treating water. The water is treated with a brackish water RO or NF membrane, but at a high feed pressure, for example a pressure of at least 50 bar. In some examples, the feed pressure may be 70 bar or more, 90 bar or more, or in a range of 70-120 bar. The membrane may have water permeability (A-Value) of at least $8*10^{-5}$ cm/s/bar at 25° C. The membrane may have salt diffusion rate, alternatively called salt permeability, (B-Value) of at least $0.5*10^{-5}$ cm/s at 25° C. The membrane may be in a spiral wound module, optionally with a permeate carrier as described in the paragraph above. The process may have a concentration end point (concentration of retentate discharged from the process) of 100 g/L or more, 130 g/L or more or 150 g/L or more.

The process may be used, for example, for brine concentration or high recovery water or wastewater treatment. Typically, a seawater membrane would be used in a process intended to produce a high concentration end point, primarily because seawater membranes have lower salt permeability. However, the inventors have observed that brackish water membranes are actually able to achieve better flux and/or higher concentration end points, particularly when operating under high pressure. Without intending to be limited by theory, the osmotic pressure when operating at high feed/retentate concentration, combined with the lower initial water permeability of seawater membranes, may result in insufficient permeate flow through a seawater membrane to reach high concentration end points.

DETAILED DESCRIPTION

A RO or NF spiral wound module as described herein can be used, for example, to concentrate a contaminant such as a salt, acid or organic compound. The process may be used to produce filtered water or to recover the contaminant. For example, the spiral wound module may be used to treat industrial wastewater, for example in a zero-liquid discharge application.

When spiral wound membrane modules are operated at moderate pressures, increasing the feed pressure increases permeate flux. Increasing feed pressure also increases the contaminant concentration in retentate discharged from the module, alternatively called the concentration end-point (CEP). However, as concentrate end point increases, the osmotic pressure of the feed water also increases. The increased osmotic pressure reduces permeate flux, which reduces the benefit of further increases in pressure. Spiral wound membranes can also deform when operating under high pressure.

A spiral wound membrane module described herein has a pressure driven membrane, e.g. reverse osmosis (RO) or nanofiltration membrane (NF), with water and salt permeability values higher than values typically used in seawater RO membranes. The use of these membranes manages the osmotic pressure build up during operation at high pressure and/or high concentration end point. In some examples, the membrane has water permeability (A-Value) of at least $8*10^{-5}$ cm/s/bar at 25° C., at least $20*10^{-5}$ cm/s/bar at 25° C. or in the range of $8\text{-}45*10^{-5}$ cm/s/bar at 25° C., or other values described herein. In some examples, the membrane has a salt diffusion rate, alternatively called salt permeability, (B-Value) of at least $0.5*10^{-5}$ cm/s at 25° C., at least $3.2*10^{-5}$ cm/s at 25° C., or in the range of $0.5\text{-}15*10^{-5}$ cm/s at 25° C. or other values described herein.

In a water treatment process, water may be fed to the spiral wound module at a high pressure, for example 50 bar or more, 70 bar more, or in a range of 50-120 bar. At moderate to high concentration end points, for example 50 g/L or more, the membrane described herein may have greater flux than typical seawater RO membranes. In some examples described herein, the spiral wound membranes may be able to achieve high concentration end points, for example over 130 g/L or in a range of 130-150 g/L, optionally while operating at a pressure of 100 bar or more.

The spiral wound module may also have a permeate carrier selected to manage module deformation. Under high pressure operation, the membrane can be pushed into gaps in the membrane supporting elements, such as the ribs of a tricot fabric. In a module, operating at high pressure can also cause the membrane spiral to pull away from the anti-telescoping device (ATD). In some examples, a spiral wound module described herein may be operated with a concentration end point of over 130 g/L, for example in a range of 130-150 g/L, at a feed pressure of 100 bar or more.

The spiral wound membrane module has a permeate carrier. The permeate carrier may be a tricot knit fabric with a set of generally parallel ribs, alternatively called wales. The permeate carrier may be knit from yarns of, for example, polypropylene (PP) or polyethylene terephthalate (PET). Optionally, the permeate carrier may be coated with a resin, for example epoxy. Optionally, the module has a permeate carrier with one or more of: a density of 54 wales per inch (25.4 mm) or more; flow channel width measured at wide parts of the channel of 215 micrometers (microns or um) or less; or, average flow channel width of 175 micrometers or less, or other values described herein. Optionally, the permeate carrier has a resin (i.e.) epoxy coating of 20 wt % or less, density of 60 wales per inch or less, flow channel width measured at narrow parts of the channel of 83 micrometers or more, average flow channel width of 121 micrometers or more, or a channel cross-sectional area of $16*10^{-9}$ m$^2$ or more, or other values described herein. Optionally, a doubly layer permeate carrier may be used.

Example 1—Membrane Selection

Spiral wound membrane modules were made with two different flat sheet membranes. Membrane A is a brackish water reverse osmosis membrane. Membrane B is a seawater reverse osmosis membrane. Both modules had the same feed spacer and permeate carrier. The feed spacer was 34 mil (0.86 mm) thick. The permeate carrier has 48 wales per inch (25.4 mm) and 40 wt % epoxy. The A-Value and B-Value were measured at 25° C. for samples of both types of membranes and the results are provided in Table 1.

TABLE 1

| | Water permeability (A-value) ($*10^{-5}$ cm/s/bar) | Salt permeability (B-Value) ($*10^{-5}$ cm/s) |
| --- | --- | --- |
| Membrane A | 21-30 | 6-11 |
| Membrane B | 3-4 | 0.1-0.4 |

Figure 1:
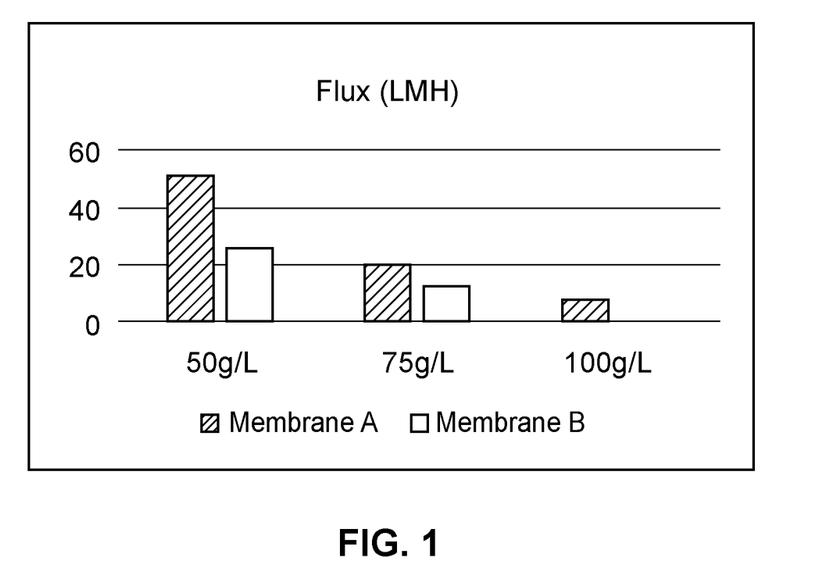
FIG. 1 shows the flux of the two modules, one with a brackish water membrane (A) and one with a seawater membrane (B), at 80 bar with a variety of feed salt concentration end points.
Figure 2:
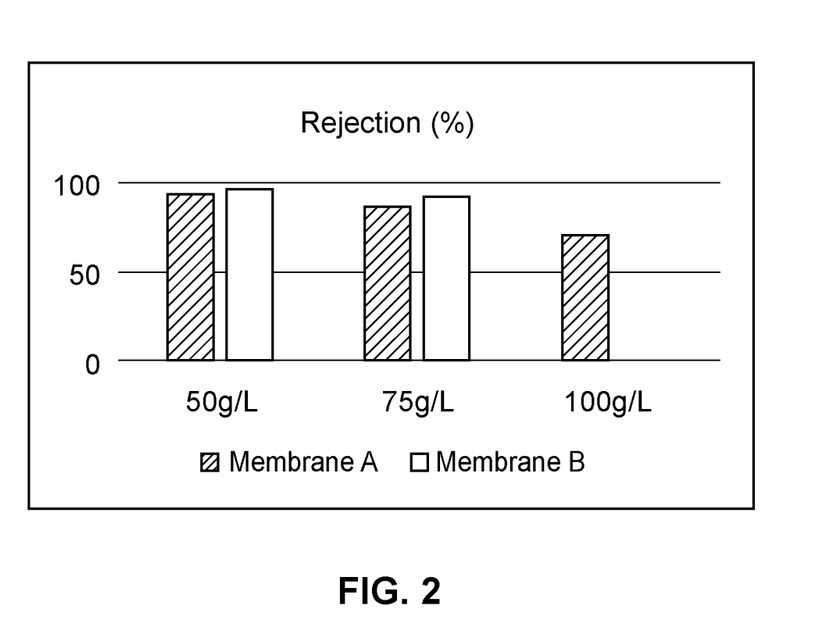
FIG. 2 shows the rejection of modules with membranes A and B of FIG. 1 at 80 bar with a variety of feed salt concentration.

The modules were operated to concentrate a salt (NaCl) solution at various feed salt concentrations and a feed pressure of 80 bar. FIG. 1 shows the flux of the two modules at a variety of feed salt concentration. FIG. 2 shows the rejection of the two modules at a variety of feed salt concentration. As indicated in FIGS. 1 and 2, the flux of the module with membrane A is much higher than the flux of the module with membrane B, while membrane A has only slightly reduced rejection compared to membrane B. At feed concentration at 100 g/L, the module with membrane A still had a flux of about 7 LMH with 70% rejection. In contrast, the module with membrane B was not able to maintain a minimum permeate flux of 5 LMH, which is considered necessary for practical use of the module, at feed concentration at 100 g/L. Module with membrane B is not suitable to concentrate feed concentration higher than 75 g/L.

Figure 3:
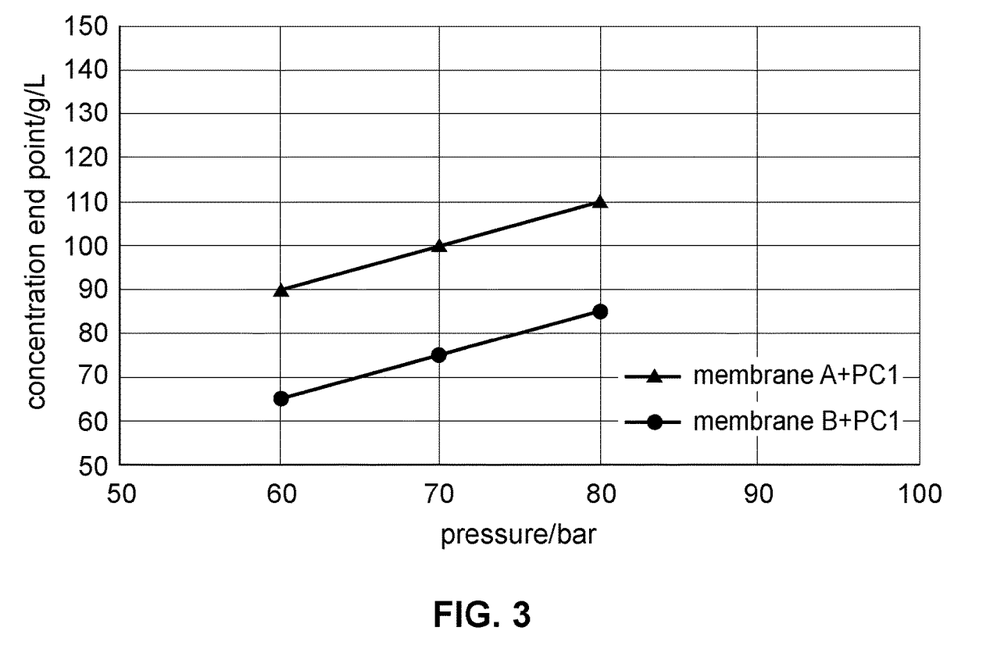
FIG. 3 shows salt concentration end points from modules of membranes A and B with a first permeate carrier, PC-1, of FIG. 4.

Modules having membranes A and B as described above, and a permeate carrier PC-1 shown in FIG. 4, were operated at a variety of pressures and their concentration end points were measured. The results are shown in FIG. 3. The module with membrane A has higher concentration end-point at a variety of operating pressures compared to a module with membrane B. In summary, membrane A provided better management of osmotic pressure during the salt concentration process.

The data shows that a membrane with a water permeability (A-Value) of at least $20*10^{-5}$ cm/s/bar at 25° C. or at least $21*10^{-5}$ cm/s/bar at 25° C. is preferred. However, it is estimated that a membrane having water permeability (A-Value) of at least $8*10^{-5}$ cm/s/bar at 25° C. would also be useful. Optionally, the membrane does not have an extremely high water permeability, for example the membrane has water permeability (A-Value) of $45*10^{-5}$ cm/s/bar at 25° C. or less, $35*10^{-5}$ cm/s/bar at 25° C. or less or $30*10^{-5}$ cm/s/bar at 25° C. or less. The data also shows that a salt permeability, (B-Value) of at least $5*10^{-5}$ cm/s at 25° C. or of at least $6*10^{-5}$ cm/s at 25° C. is preferred. However, it can be estimated that a salt permeability of at least $3.2*10^{-5}$ cm/s at 25° C. or of at least $0.5*10^{-5}$ cm/s at 25° C. may be useful. Optionally, the membrane does not have an extremely high salt permeability. For example, the membrane may have a salt permeability (B-Value) of $15*10^{-5}$ cm/s at 25° C. or less or $11*10^{-5}$ cm/s at 25° C. or less.

Example 2—Permeate Carrier Selection

Figure 4:
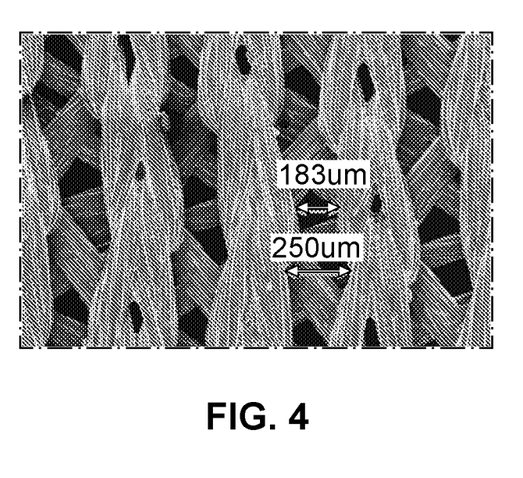
FIG. 4 is a magnified photograph of a first permeate carrier, PC-1.
Figure 5:
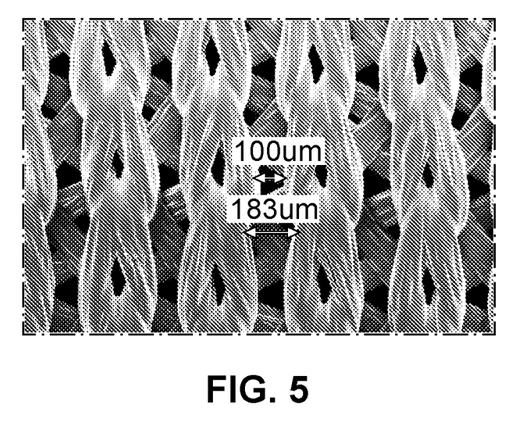
FIG. 5 is a magnified photograph of a second permeate carrier, PC-2.
Figure 6:
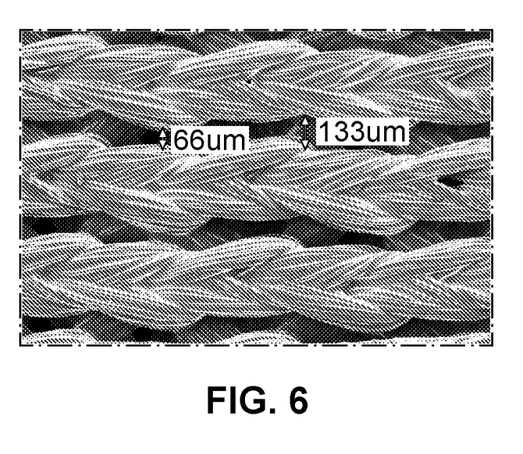
FIG. 6 is a magnified photograph of a third permeate carrier, PC-3.

Three permeate carriers (PC) were obtained, PC-1, PC-2, PC-3. Photographs of the permeate carriers are shown in FIGS. 4, 5 and 6 respectively. All three permeate carriers are made of a tricot knit fabric. One side of each permeate carrier has a series of parallel wales. The density of the permeate carrier is the number of wales per inch. Two of the three permeate carriers, PC-1 and PC-3, were epoxy coated. PC-1 is 12 mil thick. PC-2 is 10 mil thick. The wales of all of the permeate carriers are spaced apart by gaps (alternatively called channels), which define flow channels. The width of the gaps is measured at the narrow part of the gap, which is between the widest parts of the loops of adjacent wales, and at the wide part of the gap, which is between the thinnest parts of adjacent wales. Measurements are made at representative locations on the permeate carrier. Alternatively a number, for example 10, of measurements are made of the narrow part of the gap and averaged and a number, for example 10, of measurements are made of the wide part of the gap and averaged. The gap or channel height is determined by measuring the height of the wales above the sheet-form part of the tricot fabric. The channel height of all three permeate carriers was about 133 um. Channel area is determined by multiplying the channel height by the average of the width of the gap at the narrow part of the gap and the wide part of the gap. Table 2 below gives some measurements of the permeate carriers.

TABLE 2

Permeate Carrier measurements

| Permeate carrier | density (wales per inch) | Epoxy coating (wt %) | Channel width (narrow-wide, um) | Average channel width (um) | Channel area (m$^2$) |
|---|---|---|---|---|---|
| PC-1 | 48 | 40 | 183-250 | 216 | 29*10$^{-9}$ |
| PC-2 | 60 | 0 | 100-183 | 142 | 19*10$^{-9}$ |
| PC-3 | 60 | 40 | 66-133 | 100 | 13*10$^{-9}$ |

Figure 7A:
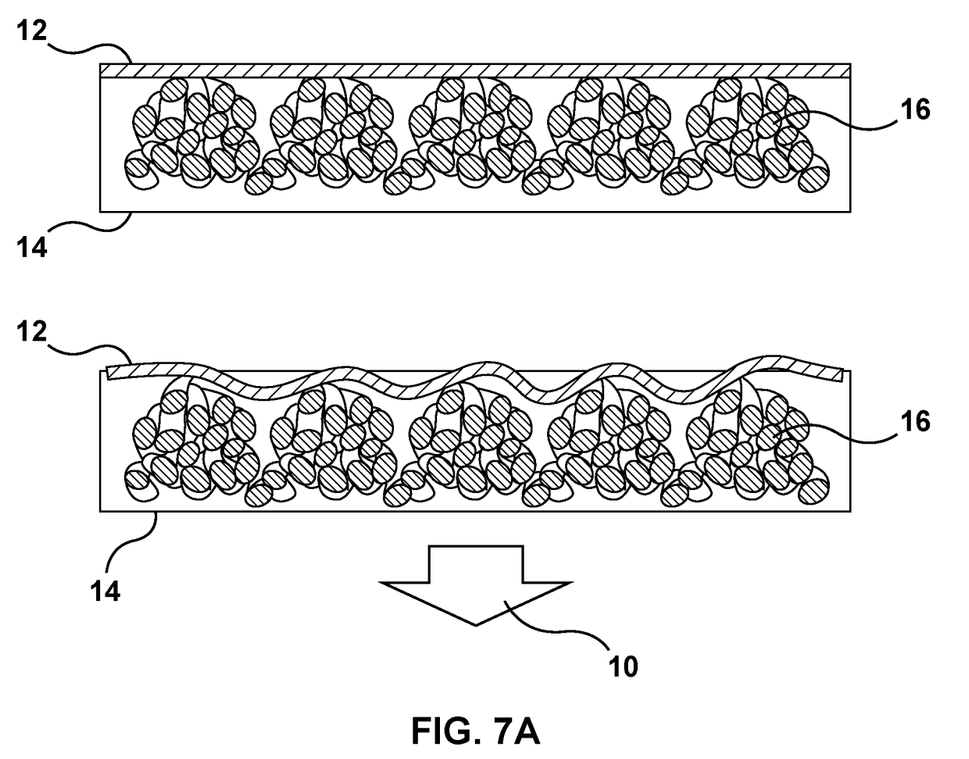
FIG. 7A is a schematic diagram showing spiral wound element deformation and FIG. 7B is a schematic diagram showing a method of measuring the deformation.
Figure 7B:
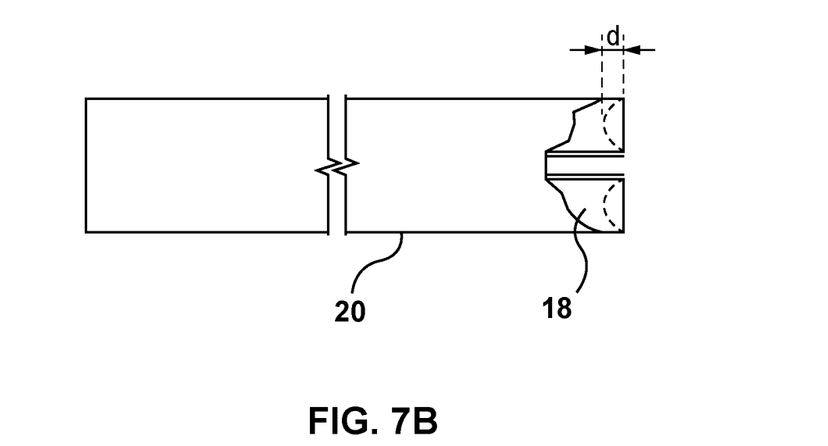

Two spiral wound modules were made with the same membrane but different permeate carriers (PC). The membrane was membrane A from Example 1. The permeate carriers were PC-1 shown in FIG. 4 and PC-2 shown in FIG. 5. The modules were operated under the same conditions at pressures of 50-80 bar for 300 hours. Referring to the top panel of FIG. 7A, when feed pressure is not applied a membrane 12 is generally flat on a permeate carrier 14. Referring to the lower panel of FIG. 7A, when feed pressure is applied and permeate 10 is produced, the membrane 12 is deformed into spaces between the wales 16 of the permeate carrier 14. Referring to FIG. 7, deformation of the membrane 12 results in a concave deformation of the end of membrane spirals 18 within a module 20. Deformation of the module 20 was determined by measuring the concavity (d) as indicated in FIG. 7. Results of these measurements are shown in Table 3.

TABLE 3 module deformation with different PC

| PC design | The depth of concave (d)/mm |
|---|---|
| PC-1 | 4-6 |
| PC-2 | 0 |

PC-1 has a gap between wales of 183-250 um wide, as measured between wide parts of the wales and narrow parts of the wales respectively. PC-2 has a gap between wales of 100-183 um wide, as measured between wide parts of the wales and narrow parts of the wales respectively. As indicated in Table 3, the module with PC-1 had greater deformation. A permeate carrier with channel width of 183 um or less at the wide parts of the channel, or an average channel width of 142 um or less, or density of 60 wales per inch or more, is able to substantially prevent deformation of the membrane at high pressure. However, it can be expected form the data that smaller density or larger channel widths between the measurements for PC-1 and PC-2, for example a permeate carrier with channel width of 215 um or less at the wide parts of the channel, or an average channel width of 175 um or less, or density of 54 wales per inch or more, would also be able to materially inhibit deformation of the membrane at high pressure.

Two spiral wound modules were made with the same membrane but different permeate carriers (PC). The membrane was membrane A from Example 1. The permeate carriers were PC-2 shown in FIG. 5 and PC-3 shown in FIG. 6. PC-3 has a gap between wales of 66-133 um wide, as measured between wide parts of the wales and narrow parts of the wales respectively. PC-3 has the same density as PC-2 but has a narrower flow channel than that of PC-2 because PC-2 is epoxy coated.

Figure 8A:
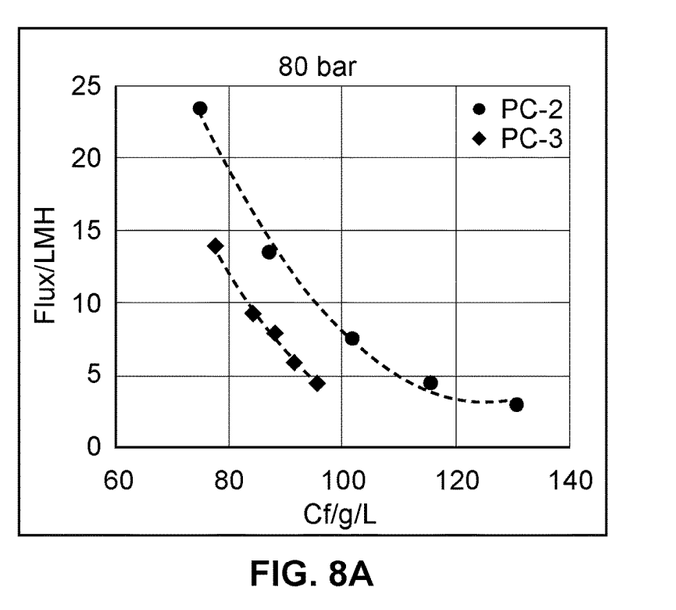
FIGS. 8A and 8B show the flux of two modules with different permeate carriers, PC-2 of FIG. 5 and PC-3 of FIG. 6, while operating at 80 bar with different feed salt concentrations.
Figure 8B:
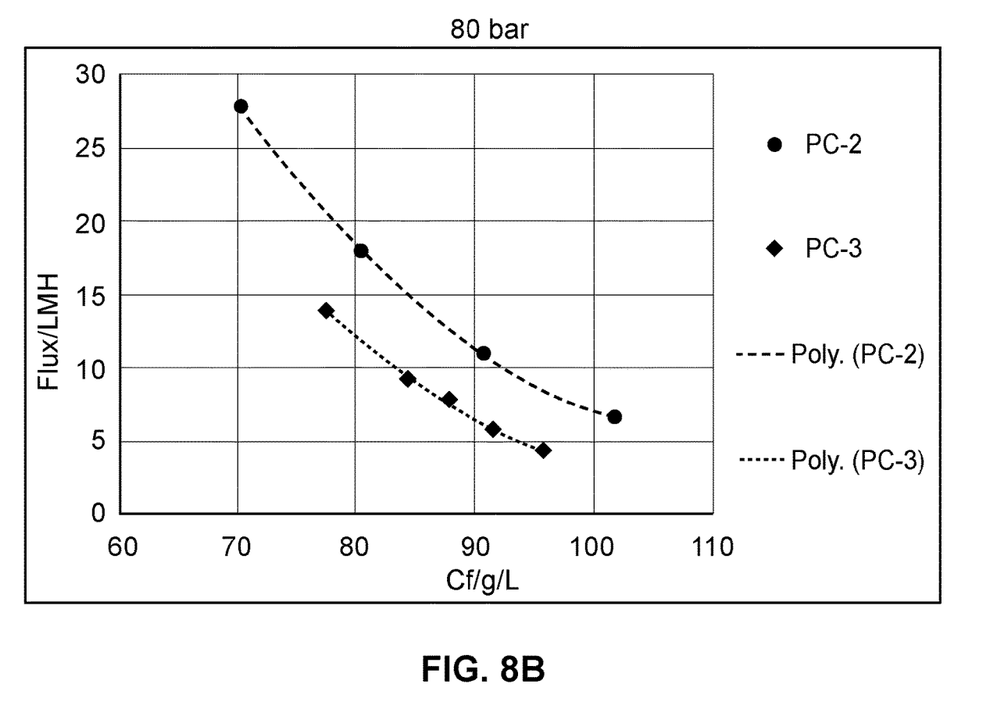
Figure 9A:
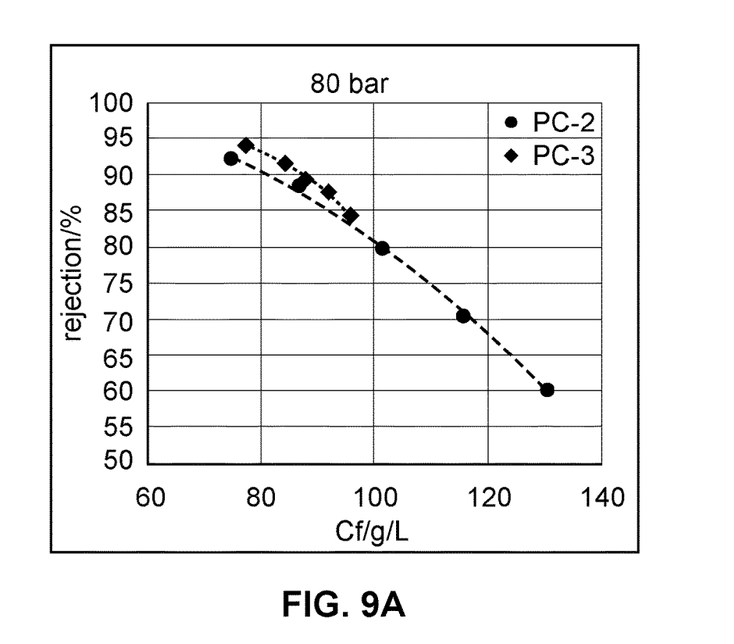
FIGS. 9A and 9B show the rejection of the two modules of FIG. 8 while operating at 80 bar with different feed salt concentrations.
Figure 9B:
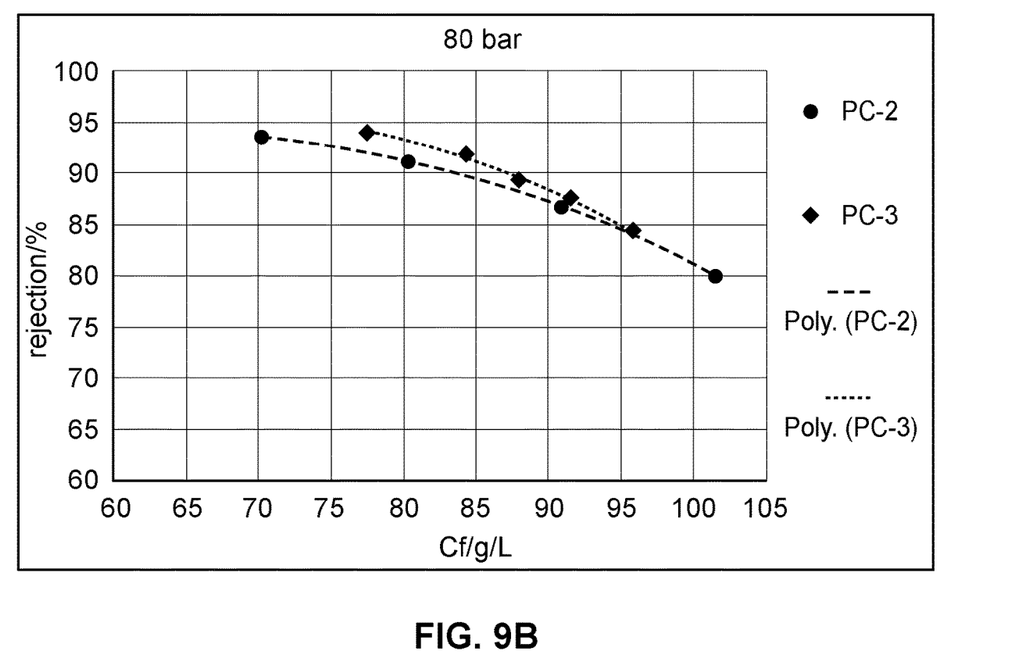
Figure 10:
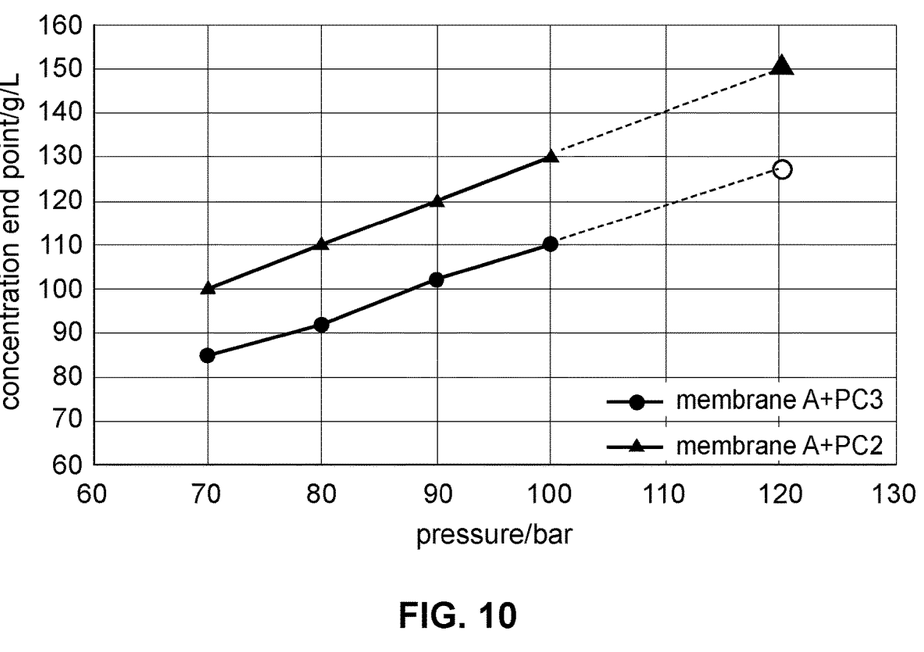
FIG. 10 shows measured and extrapolated concentration end point of the modules of FIG. 8 while operating at different pressures.

The modules were operated under the same conditions. FIGS. 8A and 8B show the flux of the modules while operating at different feed salinity concentrations at 80 bar. FIGS. 9A and 9B show the rejection of the modules while operating at different feed salinity concentrations at 80 bar. FIG. 10 shows the measured and extrapolated concentration end point of the modules while operating at different pressures and a permeate flux of 5 LMH.

As shown in FIGS. 8A, 8B, 9A, 9B and 10, the module with PC-2 has higher flux than the module with PC-3 in the feed salinity range of 70 to 95 g/L. If the feed salinity is over 110 g/L, the module with PC-3 has extremely low flux and would not be practical to use. The module with PC-2 also produces higher concentration end point than the module with PC-3. For example, the module with PC-2 is able to operate at 100 bar feed pressure and a concentrate end point of 130 g/L. Extrapolation of the data indicates that the module with PC-2 would be able to achieve a 150 g/L concentration end point if the operating pressure increased to 120 bar. The data indicates that a preferred module has a permeate carrier that is not epoxy coated, has a channel cross-sectional area of 19*10$^{-9}$ m$^2$ or more, a channel width measured at the narrow parts of the channel of 100 um or more, or an average channel width of 142 um or more. However, it can be estimated that improved performance would also be achieved with a permeate carrier having an epoxy coating of 20 wt % or less, a channel cross-sectional area of 16*10$^{-9}$ m$^2$ or more, a channel width measured at the narrow parts of the channel of 83 um or more, or an average channel width of 121 um or more.

We claim:

1. A spiral wound membrane module comprising,
    a membrane having a water permeability (A-Value) of at least 8*10$^{-5}$ cm/s/bar at 25° C. and a salt permeability (B-Value) of at least 0.5*10$^{-5}$ cm/s at 25° C.; and,
    a permeate carrier with one or more of: a resin coating of 20 wt % or less, a channel cross-sectional area of 16*10$^{-9}$ m$^2$ or more, a density of 54 wales per inch or more; a flow channel width measured at wide parts of the channel of 215 micrometers or less; or, an average flow channel width of 175 micrometers or less.

2. The module of claim 1 wherein the permeate carrier has one or more of: a density of 60 wales per inch or less; a flow channel width measured at narrow parts of the channel of 83 micrometers or more; or an average flow channel width of 121 micrometers or more.

3. The module of claim 1 wherein the water permeability (A-Value) of the membrane is at least 21*10$^{-5}$ cm/s/bar at 25° C.

4. The module of claim 1 wherein the water permeability (A-Value) of the membrane is 45*10$^{-5}$ cm/s/bar or less.

5. The module of claim 1 wherein the salt permeability (B-Value) of the membrane is at least 3.2*10$^{-5}$ cm/s at 25° C.

6. The module of claim 1 wherein the salt permeability (B-Value) of the membrane is $15*10^{-5}$ cm/s or less at 25° C.

7. A process for treating water comprising,
feeding water at a pressure of at least 50 bar through a spiral wound membrane module according to claim 1 thereby creating a permeate and a retentate.

8. The process of claim 7 wherein the feed pressure is in a range of 70-120 bar.

9. The process of claim 7 wherein the retentate has a concentration of 100 g/L or more.

10. The process of claim 7 wherein the module has a permeate carrier with one or more of: a density of 54 wales per inch or more; flow channel width measured at wide parts of the channel of 215 micrometers or less; or, average flow channel width of 175 micrometers or less.

11. The process of claim 7 wherein the module has a membrane with a water permeability (A-Value) of $45*10^{-5}$ cm/s/bar at 25° C. or less.

12. The process of claim 7 wherein the module has a permeate carrier with one or more of: resin coating of 20 wt % or less; density of 60 wales per inch or less; flow channel width measured at narrow parts of the channel of 83 micrometers or more; average flow channel width of 121 micrometers or more; or, a channel cross-sectional area of $16*10^{-9}$ m$^2$ or more.

13. The process of claim 7 wherein the membrane has a salt permeability (B-Value) of $15*10^{-5}$ cm/s at 25° C. or less.

14. The process of claim 7 wherein the membrane has water permeability (A-Value) of $45*10^{-5}$ cm/s/bar at 25° C. or less.

15. The module of claim 1 wherein the permeate carrier comprises a tricot knit fabric.

16. The module of claim 1 wherein the permeate carrier is knit from polypropylene (PP) yarn or polyethylene terephthalate (PET) yarn.

17. The module of claim 1 wherein the salt permeability (B-Value) of the membrane is at least $6*10^{-5}$ cm/s at 25° C.

18. The module of claim 1 wherein the salt permeability (B-Value) of the membrane is $11*10^{-5}$ cm/s or less at 25° C.

19. The module of claim 1 wherein the water permeability (A-Value) of the membrane is $35*10^{-5}$ cm/s/bar or less at 25° C.

20. The module of claim 1 wherein the water permeability (A-Value) of the membrane is $30*10^{-5}$ cm/s/bar or less at 25° C.

* * * * *